US012664538B2

(12) United States Patent
Teunissen et al.

(10) Patent No.: US 12,664,538 B2
(45) Date of Patent: Jun. 23, 2026

(54) SINGLE POINT OF CREATION

(71) Applicant: Code 4 Media Group, Inc., Huntington Beach, CA (US)

(72) Inventors: Frank Teunissen, Queensland (AU); Kevin Elliott, Huntington Beach, CA (US)

(73) Assignee: Code 4 Media Group, Inc., Huntington Beach, CA (US)

( * ) Notice: Subject to any disclaimer, the term of this patent is extended or adjusted under 35 U.S.C. 154(b) by 0 days.

(21) Appl. No.: 18/591,584

(22) Filed: Feb. 29, 2024

(65) Prior Publication Data

US 2025/0278716 A1     Sep. 4, 2025

(51) Int. Cl.
*G06Q 20/36*          (2012.01)
*G06Q 20/38*          (2012.01)

(52) U.S. Cl.
CPC ....... *G06Q 20/3672* (2013.01); *G06Q 20/389* (2013.01)

(58) Field of Classification Search
CPC .................... G06Q 20/3672; G06Q 20/389
See application file for complete search history.

(56) References Cited

U.S. PATENT DOCUMENTS

| | | | |
|---|---|---|---|
| 2021/0097795 A1* | 4/2021 | Manchovski | ......... H04L 63/108 |
| 2021/0103938 A1 | 4/2021 | Bulawski et al. | |
| 2023/0070389 A1* | 3/2023 | Madhusudhan | ..... G06Q 10/083 |
| 2023/0246836 A1* | 8/2023 | Wentker | .............. G06F 21/1014 |
| | | | 713/159 |
| 2024/0161077 A1* | 5/2024 | Bowman | ............ G06Q 20/3829 |
| 2025/0069094 A1* | 2/2025 | Weigold | ........... G06K 19/06028 |

* cited by examiner

*Primary Examiner* — Eduardo Castilho
*Assistant Examiner* — Karlyannie M. Garcia
(74) *Attorney, Agent, or Firm* — Patent Law Works, LLP

(57)                    ABSTRACT

A system and method for generating non-fungible tokens (NFTs) associated with encrypted near-field communication (NFC) tags is described. In an example implementation, the system may include an NFT creation platform configured to receive a request to generate an NFT in association with an asset. A wallet having a private key is then generated. A smart contract associated with the NFT can then be configured. The smart contract may have a unique identifier, and the NFT creation platform may be further configured to encrypt the unique identifier of the smart contract using the private key of the wallet. The encrypted unique identifier of the smart contract may then be stored in a database.

17 Claims, 5 Drawing Sheets

130

Figure 4:
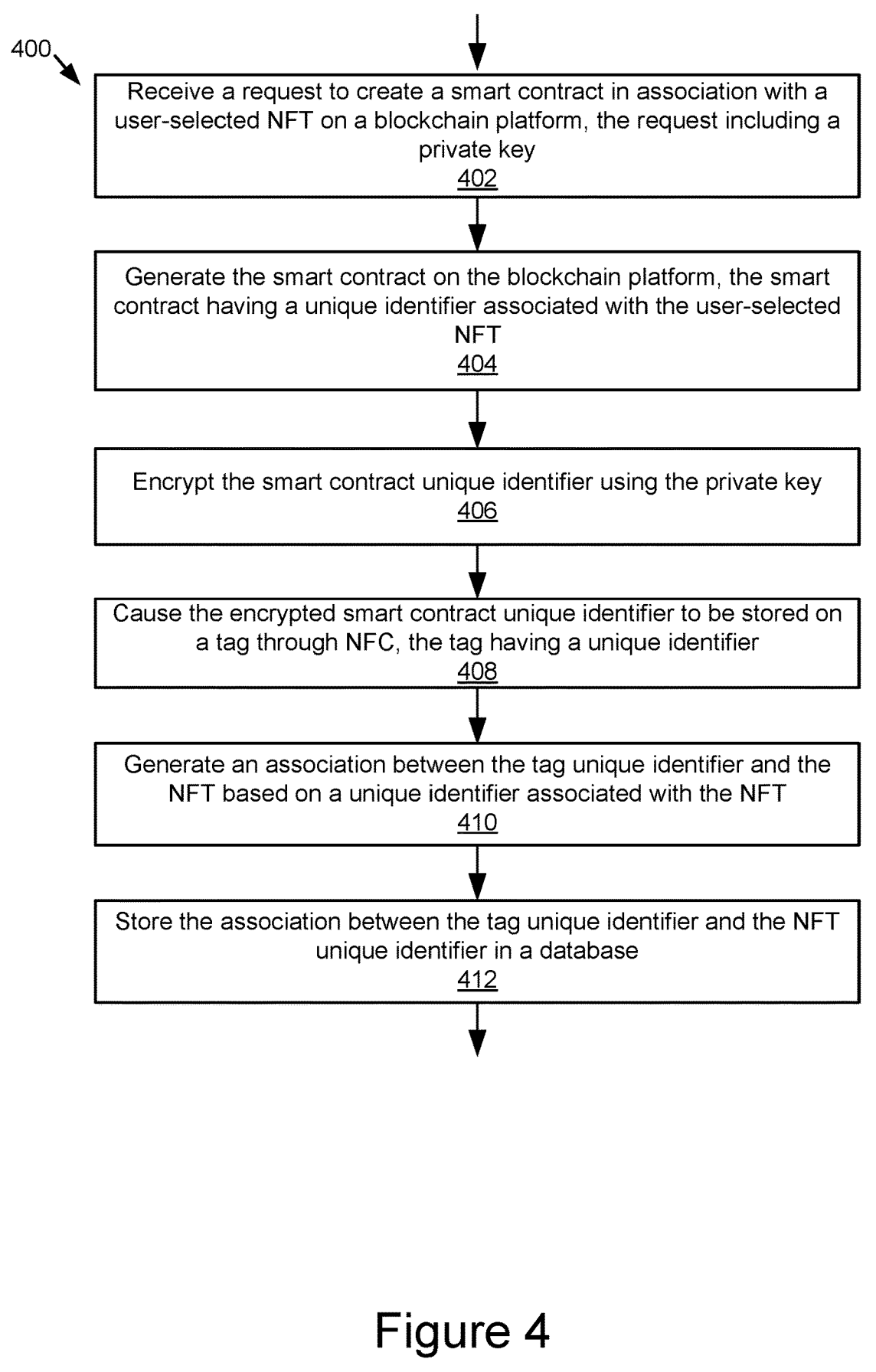

400

Receive a request to create a smart contract in association with a user-selected NFT on a blockchain platform, the request including a private key
402

Generate the smart contract on the blockchain platform, the smart contract having a unique identifier associated with the user-selected NFT
404

Encrypt the smart contract unique identifier using the private key
406

Cause the encrypted smart contract unique identifier to be stored on a tag through NFC, the tag having a unique identifier
408

Generate an association between the tag unique identifier and the NFT based on a unique identifier associated with the NFT
410

Store the association between the tag unique identifier and the NFT unique identifier in a database
412

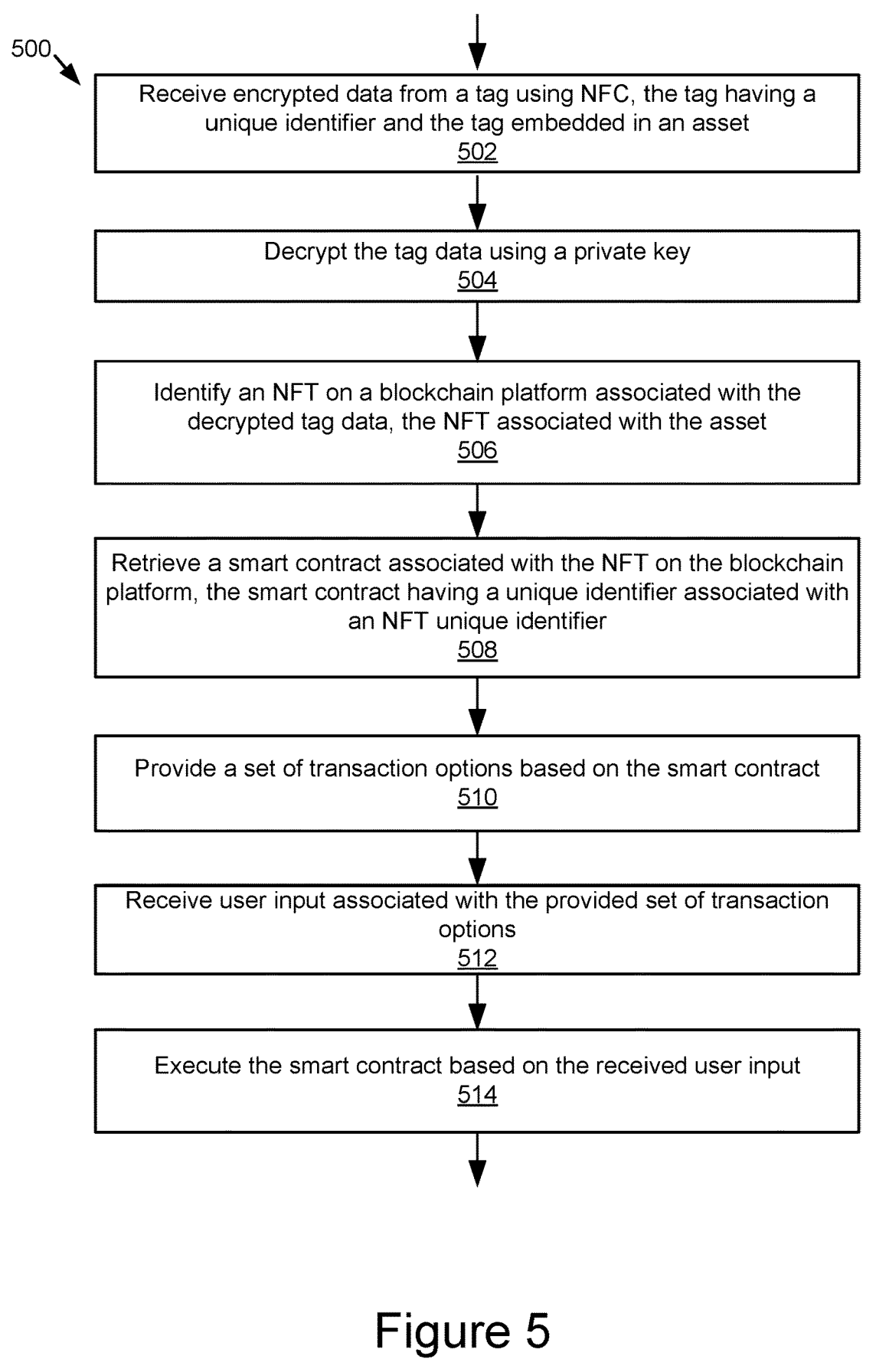

Receive encrypted data from a tag using NFC, the tag having a
unique identifier and the tag embedded in an asset
502

Decrypt the tag data using a private key
504

Identify an NFT on a blockchain platform associated with the
decrypted tag data, the NFT associated with the asset
506

Retrieve a smart contract associated with the NFT on the blockchain
platform, the smart contract having a unique identifier associated with
an NFT unique identifier
508

Provide a set of transaction options based on the smart contract
510

Receive user input associated with the provided set of transaction
options
512

Execute the smart contract based on the received user input
514

Figure 5

SINGLE POINT OF CREATION

BACKGROUND

The specification relates to electronic tracking systems. In particular, the specification relates to a system and method for generating non-fungible tokens (NFTs) associated with encrypted near-field communication (NFC) tags.

Electronic tracking systems enable manufacturers and consumers track products from creation to point of sale. Within these systems, users of electronic tracking systems may use NFC tags to uniquely identify a particular physical asset. Previously, physical asset inventory systems relied on barcodes to identify an asset. Additionally, non-fungible tokens (NFTs) are assets that have been tokenized via a blockchain. NFTs have been used to uniquely identify virtual assets, such as works of art, collectibles, trading cards, music, virtual worlds, and digital representations of physical assets. There lacks a mechanism to associate NFTs with encrypted NFC tags that may be generated by manufacturers of physical assets that wish to tokenize their physical assets.

SUMMARY

According to one innovative aspect of the subject matter described in this disclosure, a system for generating NFTs associated with encrypted NFC tags includes a processor and a memory storing instructions when executed cause the system to generate an NFT that has been associated with an encrypted NFC tag through a private key.

In general, a Web3 user mints NFTs that are digital representations of physical assets through a digital wallet application. First, a new digital wallet is created by the user. The digital wallet creates a private key only known to the user. Through the digital wallet, the user creates a smart contract for an NFT that has its own unique identifier. Each NFT that the Web3 user creates is uniquely identified and directly linked to one blockchain address. Each token has an owner, and the ownership information (i.e., the address in which the minted token resides) is publicly available. Ethereum is an example blockchain that records and mints NFTs for assets. A creator of a physical asset may tag their asset with another unique identifier that is linked to the minted NFT using the same private key combined with the unique identifier from the smart contract to encrypt the tag through near-field communication (NFC) using an NFC tag application. In this way, the NFC tag is forever linked with the NFT because the same unique identifier of the smart contract and the private key are used to encrypt the NFC tag.

As an example, a physical asset, such as a collectible sports jersey, may be embedded with an encrypted NFC tag using this process. The manufacturer may create an NFT by minting the token on the blockchain using a digital wallet that has a private key. Using the same private key to encrypt the NFC tag that stores the unique identifier of the smart contract associated with the NFT, the manufacturer has forever linked the NFT to the encrypted NFC tag. Upon sale or transfer of the collectible sports jersey, the point of sale device executes the smart contract and the ownership of the NFT is updated to the new owner after the sale is completed. Additionally, the new owner must have their own digital wallet associated with their own private key that encrypts the NFC tag embedded within the collectible sports jersey after the sale.

When NFT is created, the user who creates the NFT may name the asset. The name will be unique, and the naming can only be done once per asset identifier (ID). In case there are duplicate assets, the assets will be differentiated by the asset ID. Returning to the example above, the collectible sports jersey may be one of fifty that are made, each jersey having a unique asset ID.

Other aspects include corresponding methods, systems, apparatus, and computer program products for these and other innovative aspects.

The present disclosure may be particularly advantageous in a number of respects. First, the system enables new NFTs to be generated and physically associated with a physical asset through an encrypted NFC tag, enhancing the tracking of the physical asset. Second, the system implements a process to encrypt NFC tags using the private keys associated with minted NFTs for tagging physical assets, further enhancing management of the physical assets. Third, the system uses an NFC tag application that works with a digital wallet application to manage the sale and/or transfer of NFTs and their associated encrypted NFC tagged physical assets, enabling real world commerce to occur at the same time an NFT is sold or transferred on the blockchain. This prevents forgeries and/or counterfeit assets to enter the marketplace. The foregoing advantages are illustrated by way of example, and it should be understood that the present disclosure may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 is an example method of generating NFTs associated with encrypted NFC tags for users according to some implementations.

FIG. 5 is an example method of transferring NFTs associated with encrypted NFC tags for users according to some implementations.

DETAILED DESCRIPTION

Figure 1:
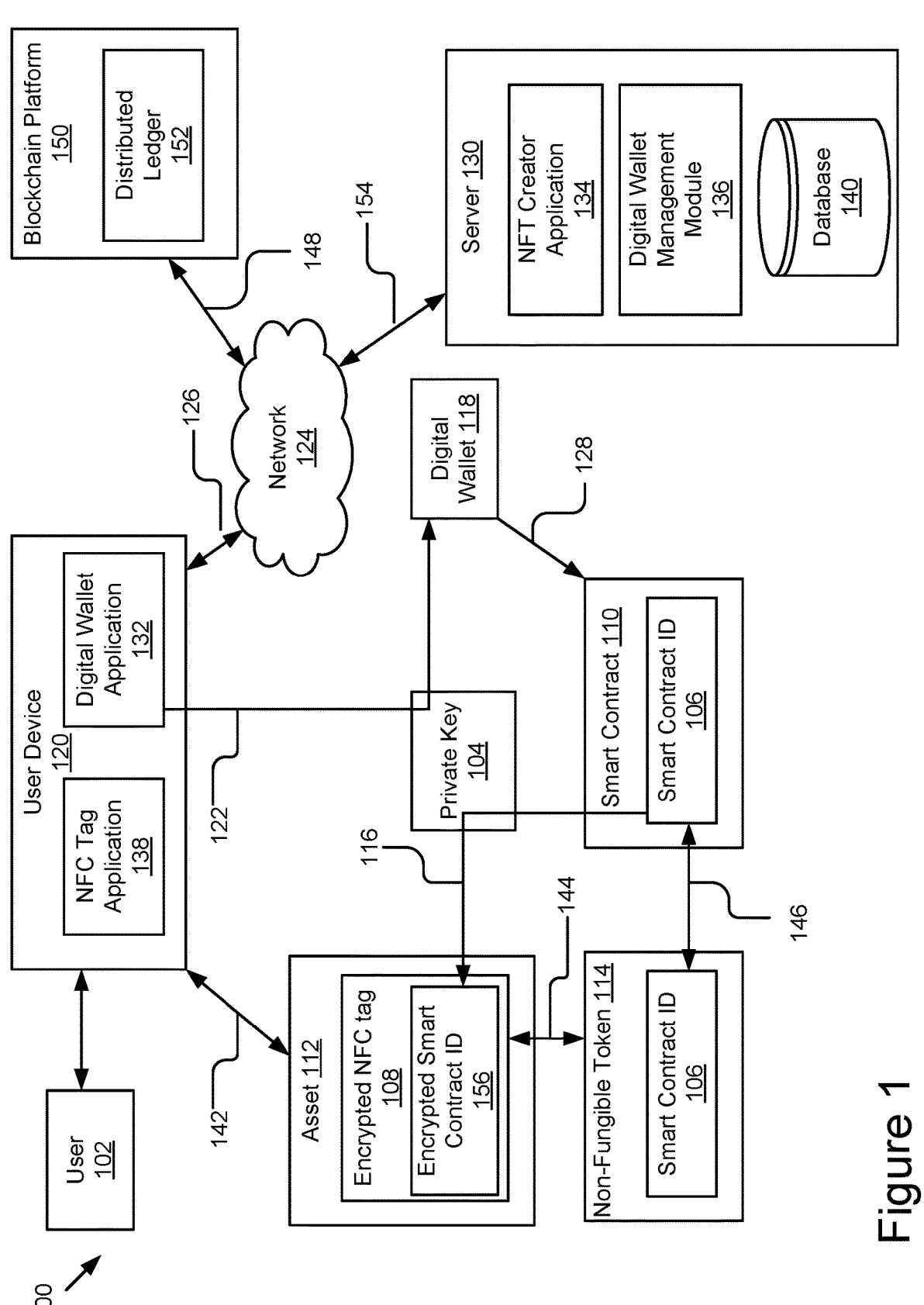
FIG. 1 is a high-level block diagram illustrating an example system for generating NFTs associated with encrypted NFC tags for users according to some implementations.

FIG. 1 is a block diagram illustrating an example system 100 for generating NFTs associated with encrypted NFC tags for users according to some implementations. The illustrated system 100 includes a server 130 and a user device 120 that can be accessed by a user (e.g., a creator) 102. While FIG. 1 illustrates one user device 120 and one server 130, the present disclosure applies to a system architecture having one or more user devices 120 and/or one or more servers 130. Furthermore, although FIG. 1 illustrates one network 124 coupled to the user devices 120 and the server 130, in practice one or more networks 124 can be connected to these entities.

The network 124 can be a conventional type, wired or wireless, and may have numerous different configurations including a star configuration, token ring configuration or other configurations. Furthermore, the network 124 may include a local area network (LAN), a wide area network (WAN) (e.g., the Internet), and/or other interconnected data paths across which multiple devices may communicate. In some implementations, the network 124 may be a peer-to-peer network. The network 124 may also be coupled to or includes portions of a telecommunications network for sending data in a variety of different communication protocols. In some implementations, the network 124 includes Bluetooth communication networks or a cellular communications network for sending and receiving data including via short messaging service (SMS), multimedia messaging service (MMS), hypertext transfer protocol (HTTP), direct data connection, WAP, email, etc.

In some implementations, the user device 120 may be a computing device that includes a memory and a processor, for example a laptop computer, a desktop computer, a tablet computer, a mobile telephone, a personal digital assistant (PDA), a mobile email device, a portable game player, a game controller, a portable music player or other electronic device capable of accessing a network 124. A user 102 can be a creator of the NFT and/or manufacturer of a physical asset 112 that is embedded with an encrypted NFC tag 108. In the illustrated implementation, the user 102 interacts with the user device 120, which is communicatively coupled to the network 124 via signal line 126. The user device 120 includes a digital wallet application 132 and an NFC tag application 138. The user 102 uses the digital wallet application 132 through the user device 120 to create a new digital wallet 118, via signal line 122, that is associated with a private key 104 unique to the digital wallet 118.

The digital wallet application 132 can include code and routines for generating and managing a digital wallet for a user. In some implementations, the digital wallet application 132 can be implemented using hardware including a field-programmable gate array (FPGA) or an application-specific integrated circuit (ASIC). In some other implementations, the digital wallet application 132 can be implemented using a combination of hardware and software. In some implementations, the digital wallet application 132 may be stored in a combination of the devices and servers, or in one of the devices or servers. The digital wallet application 132 is described below in more detail with reference to FIGS. 2-5.

The NFC tag application 138 can include code and routines for configuring and managing an NFC tag for an asset. As illustrated in FIG. 1, a user device 120 may configure and encrypt a tag through near-field communication (NFC) via signal line 142 using an NFC tag application 138. An asset 112 may include the encrypted NFC tag 108 that is configured to store an encrypted smart contract identifier (ID) 156. The NFC tag application 138 requests the encrypted smart contract ID 156 from the server 130 based on the generated NFT 114. The NFC tag application 138 then stores the encrypted smart contract ID 156 onto the encrypted NFC tag 108 using the NFT 114 via signal line 144. In some implementations, the NFC tag application 138 can be implemented using hardware including a field-programmable gate array (FPGA) or an application-specific integrated circuit (ASIC). In some other implementations, the NFC tag application 138 can be implemented using a combination of hardware and software. In some implementations, the NFC tag application 138 may be stored in a combination of the devices and servers, or in one of the devices or servers. The NFC tag application 138 is described below in more detail with reference to FIGS. 2-5.

The server 130 can be a hardware server that includes a processor, a memory and network communication capabilities. The server 130 is communicatively coupled to the network 124 via signal line 154. In some implementations, the server 130 sends and receives data to and from the user devices 120 via the network 124. In some implementations, the server 130 is a e-commerce network server that provides an e-commerce platform service to users. For example, one or more users can buy and sell NFTs and the associated assets and publish the transactions on an e-commerce platform. In other implementations, the server 130 is a social network server that provides an e-commerce platform service to its users. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. As an example, a friend of a user may purchase a purse for a user, where the purse is a physical asset embedded with an encrypted NFC tag that is associated with an NFT, a digital representation of the purse, that is uniquely identified on the blockchain. In some implementations, the server 130 is a game server that provides one or more online games to users. For example, a game may mint a pizza NFT that is associated with a redeemable gift card that is embedded with the encrypted NFC tag and redeemable for a pizza to be delivered to the user in real-life. In other implementations, the server 130 can be another type of server that provides other services to users, such as weapons tracking systems, jewelry inventory systems, art collection management systems, sports memorabilia tracking systems, and so on.

In the illustrated implementation, the server 130 includes an NFT creator application 134, a digital wallet management module 136, and a database 140. The NFT creator application 134 provides functionality to create an NFT on a blockchain platform 150, communicatively coupled to the network 124 via signal line 148. For example, the blockchain platform 150 may include a distributed ledger 152 on which the NFT may be minted by the NFT creator application 134. After a digital wallet 118 is generated, a smart contract 110 is created, through the blockchain platform 150 via signal line 128, that includes a smart contract identifier (ID) 106. The non-fungible token 114 that is generated uses the same smart contract ID 106 via signal line 146. The smart contract ID 106 is encrypted using the private key 104 associated with the digital wallet 118 of the user device 120 via signal line 116. The encrypted smart contract ID 156 is stored in the database 140 and stored on the encrypted NFC tag 108 by the NFC tag application 138.

The digital wallet management module 136 may include software and/or logic to provide the functionality for managing digital wallets generated by user devices 120. For example, a digital wallet 118 may be generated by the digital wallet application 132 on the user device 120 and stored by the digital wallet management module 136 on the server 130 in the database 140. As new digital wallets 118 are created, they may be managed and stored in database 140 by the digital wallet management module 136. Additionally, as new NFTs are generated using the same digital wallet 118, the unique identifiers of the NFTs (i.e., the unique addresses on the distributed ledger 152 of the blockchain platform 150) are stored in association with the digital wallet 118 in the database 140.

The database 140 can be a non-transitory memory that stores data for providing the functionality described herein. For example, the NFT creator application 134 receives the unique identifiers of the NFTs generated by the user 102 and stores the unique identifiers of the NFTs in association with the identifier of the digital wallet 118 associated with the user 102 in the database 140. The database 140 may store other data associated with the server 130. The database 140 may be a dynamic random access memory (DRAM) device, a static random access memory (SRAM) device, flash memory or some other memory devices. In some implementations, the database 140 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
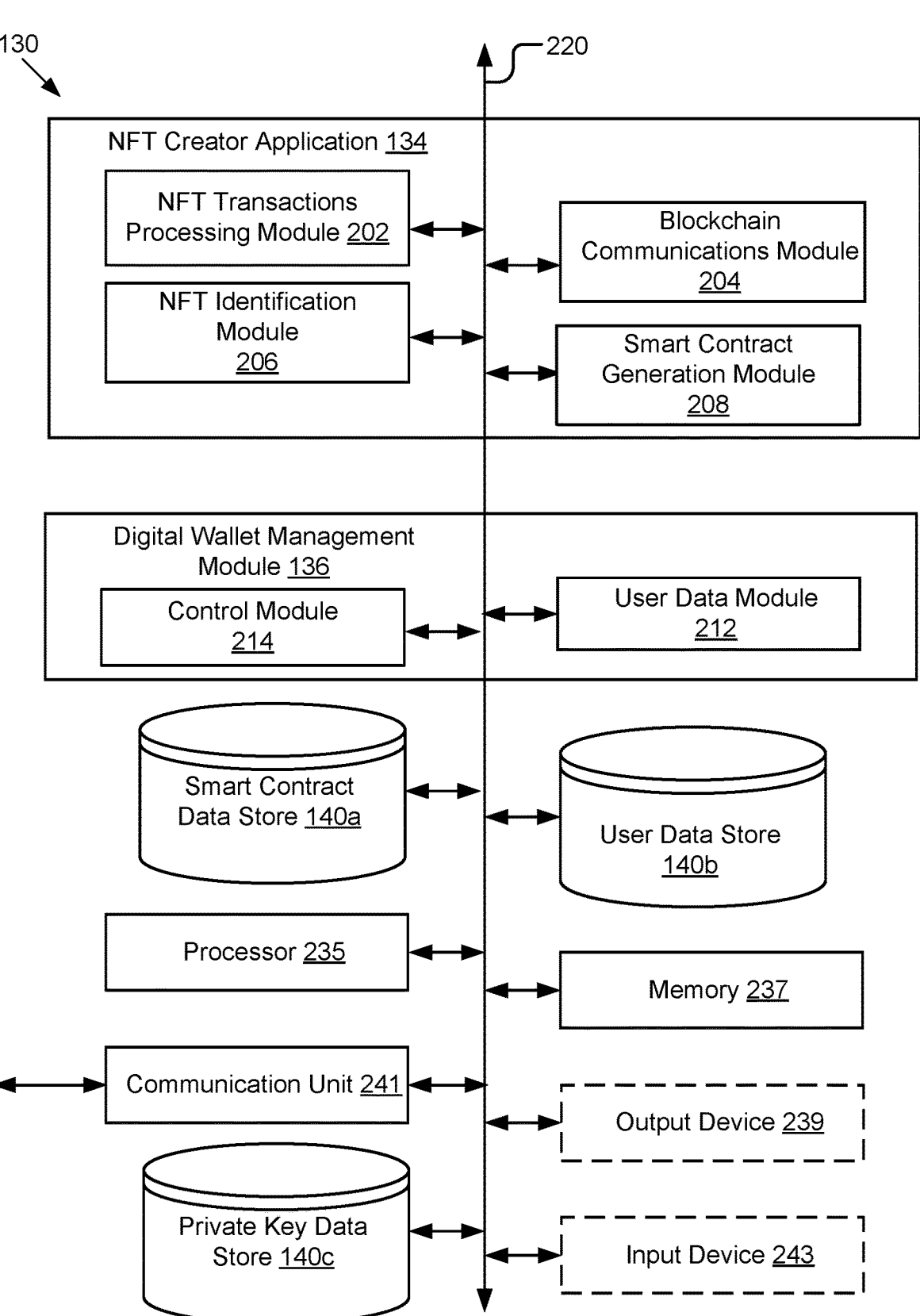
FIG. 2 is a high-level block diagram illustrating an example server according to some implementations.

Referring to FIG. 2, the NFT creator application 134 and the digital wallet management module 136 are shown in more detail. FIG. 2 is a block diagram illustrating a server 130 that includes an NFT creator application 134, digital wallet management module 136, a processor 235, a memory 237, a communication unit 241, an input device 243, an output device 239, a smart contract data store 140a, a user data store 140b, and a private key data store 140c according to some examples. In FIG. 2 and the remaining figures, a letter after a reference number, e.g., "140a," represents a reference to the element having that particular reference number. A reference number in the text without a following letter, e.g., "140," represents a general reference to implementations of the element bearing that reference number. The components of the server 130 are communicatively coupled by a bus 220. In some embodiments, the components of server 130 may reside in a third-party system connected to the server 130 over a network 124.

The processor 235 includes an arithmetic logic unit, a microprocessor, a general purpose controller or some other processor array to perform computations and provide electronic display signals to a display device. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from the server 130 or user device 120 depending upon where the digital wallet application 132 or NFC tag application 138 is stored. In some implementations, the communication unit 241 includes a port for direct physical connection to the network 124 or to another communication channel. For example, the communication unit 241 includes a USB, SD, CAT-5 or similar port for wired communication with the server 130 or user device 120. In some implementations, the communication unit 241 includes a wireless transceiver for exchanging data with the server 130 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 124 for distribution of files and/or media objects using standard network protocols including TCP/IP, HTTP, HTTPS and SMTP, etc.

The input device 243 can be any device to input data to the server 130. For example, the input device 243 is one of a game controller, a touch-sensitive device that receives gestural commands (e.g., a tap, double tap, scroll, swipe, etc.) from a user, a mouse, a track ball or other type of pointing device to input data into the user device 115. In some implementations, the input device 243 includes one or more of a keyboard (e.g., a QWERTY keyboard), a microphone, a web camera or similar audio or video capture device.

The output device 239 can be a conventional type such as a liquid crystal display (LCD) or any other similarly equipped display device, screen or monitor. The output device 239 represents any device equipped to display electronic images and data as described herein. In some implementations, the input device 243 and the output device 239 are integrated to form a touch screen.

The data stores 140 may include a storage device that can be a non-transitory memory that stores data for providing the functionality described herein. The data stores 140 may be a dynamic random access memory (DRAM) device, a static random access memory (SRAM) device, flash memory or some other memory devices. In some implementations, the storage device also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the data stores 140 stores inputs (e.g., keystrokes) provided by a user operating on the user device 120. A smart contract data store 140a may include metadata regarding smart contracts that are created by the user through the NFT creator application 134, such as through the smart contract generation module 208. A user data store 140b may include metadata regarding users that have created NFTs through the NFT creator application 134, such as through the NFT identification module 206, as well as users that have been part of transactions that involve the sale or transfer of NFTs, such as through the NFT transactions processing module 202 and/or user data module 212 of the digital wallet management module 136. Once an NFT is generated, its address on the blockchain may be determined using the NFT identification module 206 and then the associated smart contract identifier may be stored in the smart contract data store 140a, for example. A private key data store 140c may include metadata regarding private keys that are generated through the creation of digital wallets, such as through the digital wallet management module 136, including the control module 214 and/or user data module 212. One or more databases 140 may store any other data for providing the functionality described herein. The databases 140 may include a blockchain that stores transactional data in a digital ledger. These transactions may be performed and/or processed by the NFT transactions processing module 202, for example. Messages to the blockchain platform, such as blockchain platform 150 illustrated in FIG. 1, may be generated through the blockchain communications module 204, for example. Such messages may include a request to mint an NFT, a request to transfer ownership of an NFT, and so forth.

In the illustrated implementation shown in FIG. 2, the digital wallet management module 136 includes a control module 214 and a user data module 212. These components of the digital wallet management module 136 are communicatively coupled to each other via the bus 220.

The control module 202 can be software including routines for handling communications between the digital wallet management module 136 and other components of the server 130. In some implementations, the control module 202 can be a set of instructions executable by the processor 235 to provide the functionality described below for handling communications between the digital wallet management module 136 and other components of the server 130. In some other implementations, the control module 202 can be stored in the memory 237 of the server 130 and can be accessible and executable by the processor 235. The control module 202 may be adapted for cooperation and communication with the processor 235 and other components of the server 130 via the bus 220.

The control module 202 sends and receives data, via the communication unit 241, to and from other entities of the system 100. For example, the control module 202 receives, via the communication unit 241, one or more packets from other user devices 120 operated by other users performing transactions with their digital wallets. In some implementations, the control module 202 handles communications between components of the digital wallet management module 136. For example, the control module 202 receives data describing a purchase of an NFT and its associated real-world asset and sends the data to the user data module 212 for presenting the purchase of the NFT to the user. The purchase may incorporate the digital representation of the real-world asset into the inventory of the user's digital wallet through the digital wallet management module 136, in an embodiment.

In some implementations, the control module 214 receives data from components of the digital wallet management module 136 and stores the data in the database 140. For example, the control module 202 receives a transaction result and stores the transaction result in the database 140.

The user data module 212 can be software including routines for generating data associated with users, such as interactions in a software service and/or NFT & asset purchases and/or transfers. In some implementations, the user data module 212 can be a set of instructions executable by the processor 235 to provide the functionality described below for generating data for tracking data generated by users. In some other implementations, the user data module 212 can be stored in the memory 237 of the server 130 and can be accessible and executable by the processor 235. The user data module 212 may be adapted for cooperation and communication with the processor 235 and other components of the server 130 via the bus 220.

The foregoing description of FIG. 2 illustrates an example scenario where two users (e.g., the first user and the second user) perform a transaction on an NFT in the same blockchain platform. It should be understood that in some implementations more than two users (e.g., an owner sells an NFT and the associated asset to more than one buyer) can participate in a single transaction simultaneously and similar operations can be performed. In an embodiment, fractional ownership of an NFT and its associated asset may be configured in the smart contract for the NFT. Additionally, multiple NFTs may be combined to form a new NFT by a user and the new smart contract that is generated may be stored in the smart contract data store 140a to be made available for purchase. For example, a set of collectible toys may be combined as one NFT such that each individual NFT for each collectible toy is merged into the NFT for the set.

Figure 3:
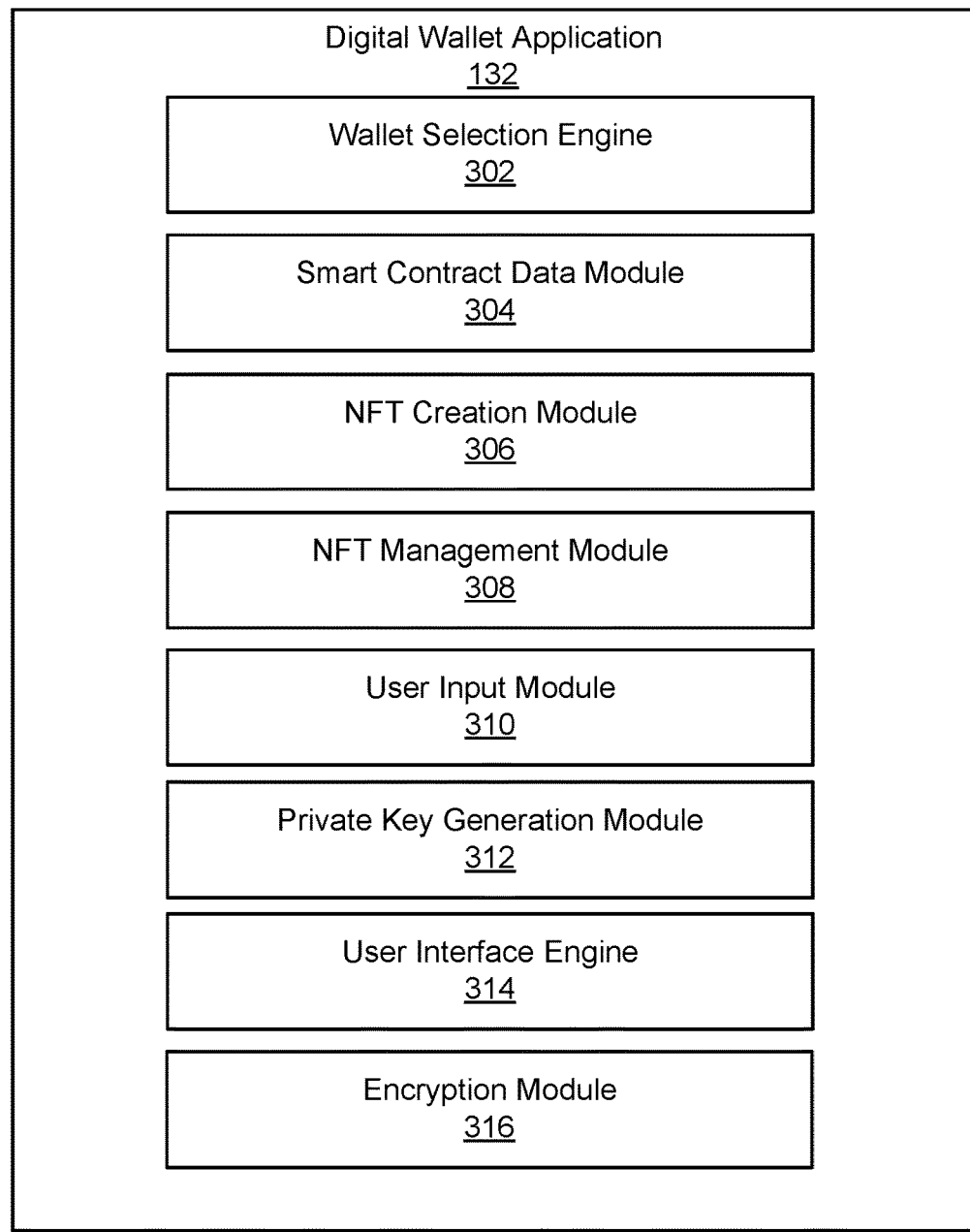
FIG. 3 is a high-level block diagram illustrating an example digital wallet application and an example NFC tag application according to some implementations.

FIG. 3 is a block diagram illustrating an example digital wallet application and an example NFC tag application. As shown in FIG. 3, a digital wallet application 132 may include a wallet selection engine 302, a smart contract data module 304, an NFT creation module 306, an NFT management module 308, a user input module 310, a private key generation module 312, a user interface engine 314, and an encryption module 316, in an embodiment. An NFC tag application 138 may include an NFC tag data management module 318, in an embodiment.

The wallet selection engine 302 may include software and/or logic to provide the functionality for enabling a user to select a digital wallet associated with a particular blockchain platform. For example, a digital wallet for Ethereum may be completely separate from a digital wallet for Bitcoin. NFTs minted on the Ethereum blockchain may have different properties and/or metadata from NFTs minted on the Bitcoin blockchain. The wallet selection engine 302 thus enables the user to decide which blockchain platform to use.

The smart contract data module 304 may include software and/or logic to provide the functionality for handling and managing smart contract data that is generated from the creation of NFTs. For example, smart contract data may include various stipulations and/or contractual clauses that are modifiable by the user. As an example, fractional ownership of an NFT may be limited to a certain number of fractional shares as outlined in the smart contract for the NFT. The smart contract data module 306 enables the creator of the NFT to generate the specific smart contract terms they wish to associate with the NFT and have them stored in the data store 140, in an embodiment.

The NFT creation module 306 may include software and/or logic to provide the functionality for managing the creation of the NFT on the blockchain. For example, the process of minting an NFT on the blockchain may vary, with different fees associated based on the blockchain platform and marketplaces. Ethereum, the most popular blockchain for NFTs, has higher gas fees, or transaction fees to mint an NFT on a blockchain, than less popular blockchains like Solana and Cardano. Additionally, some marketplaces charge a fee to list an NFT for sale. Other marketplaces charge a flat listing fee as a percentage of sales. Further, some marketplaces charge account setup fees. Some marketplaces offer an option for "lazy minting," meaning that no gas fees are charged until an NFT that is listed is purchased, and at that point, the buyer pays the gas fees to have the NFT minted. Lastly, other marketplaces have "gasless" minting where the token you mint will be immediately found on the Ethereum blockchain. Gasless transactions are possible due to meta transactions that allow different users to do transactions on the public blockchain with zero transaction fees.

In this framework, a third party relayer, who pays the gas and completes the transaction, uses proxy contracts to perform regular blockchain transactions. Thus, the different ways to get a new NFT to be minted may be managed by the NFT creation module 306.

The NFT management module 308 may include software and/or logic to provide the functionality for managing transactions associated with the NFT. For example, the owner may enable fractional shares of the NFT to be bought and sold or otherwise transferred. As another example, NFTs may also be promoted on various marketplaces, and thus management of the promotional campaigns may be performed through the NFT management module 308.

The user input module 310 may include software and/or logic to provide the functionality for receiving user input at the digital wallet application 132. For example, as the options on when and how to mint NFTs, options on promotion of NFTs, and other choices are requested from a creator user, the user input module 310 provides user interfaces to capture the user input. The user interface engine 314 may include software and/or logic to provide the functionality for modifying user interfaces and presenting them on user devices 120, in an embodiment.

The private key generation module 312 may include software and/or logic to provide the functionality for generating a private key for each digital wallet. Various cryptographic methods and/or techniques may be used to generate private keys.

The encryption module 316 may include software and/or logic to provide the functionality for encrypting data using a private key and a public key. For example, data encrypted with the public key can only be decrypted with the private key. Thus, the encryption module 316 may encrypt the smart contract ID so that only the creator, using the private key generated by the private key generation module 312, can decrypt the encrypted smart contract ID.

The NFC tag data management module 318 may include software and/or logic to provide the functionality for managing the data stored on the NFC tag. For example, the creator user, after creating a digital wallet, generating a private key, and generating an NFT on a blockchain, may use the encryption module 316 to encrypt the smart contract ID associated with the NFT and use the NFC tag application 138 to store the encrypted smart contract ID onto a tag embedded in an asset. The NFC tag data management module 318 enables the NFC tag application 138 to store the encrypted smart contract ID onto the tag. As ownership of the NFT and the associated asset is transferred to a new owner's digital wallet, the new owner's private key will be used to encrypt the smart contract ID such that the NFC tag application 138 modifies the encrypted NFC tag data through the NFC tag data management module 318.

FIG. 4 is an example method of generating NFTs associated with encrypted NFC tags for users according to some implementations. In method 400, step 402 includes a request being received to create a smart contract in association with a user-selected NFT on a blockchain platform where the request includes a private key.

At step 404, the smart contract is generated on the blockchain platform, where the smart contract has a unique identifier associated with the user-selected NFT.

At step 406, the smart contract is encrypted using the private key.

At step 408, the encrypted smart contract unique identifier is caused to be stored on a tag through NFC, where the tag has a unique identifier.

At step 410, an association is generated between the tag unique identifier and the NFT based on a unique identifier associated with the NFT.

At step 412, the association is stored between the tag unique identifier and the NFT unique identifier in a database.

FIG. 5 is an example method of transferring NFTs associated with encrypted NFC tags for users according to some implementations. In method 500, step 502 begins with encrypted data from a tag being received using NFC, where the tag has a unique identifier and the tag is embedded in an asset.

At step 504, the tag data is decrypted using a private key.

At step 506, an NFT associated with the decrypted tag data is identified on a blockchain platform, where the NFT is associated with the asset.

At step 508, a smart contract associated with the NFT on the blockchain platform is retrieved, where the smart contract has a unique identifier associated with an NFT unique identifier.

At step 510, a set of transaction options is provided based on the smart contract.

At step 512, user input is received associated with the provided set of transaction options.

At step 514, the smart contract is executed based on the received user input.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:
1. A computer-implemented method, comprising:
receiving a request to generate a non-fungible token (NFT) in association with a physical asset;
generating a wallet having a private key;
configuring a smart contract associated with the NFT, the smart contract having a unique identifier, the smart contract configured to enable fractional ownership of the NFT and the physical asset;
encrypting the unique identifier of the smart contract using the private key of the wallet;
storing the encrypted unique identifier of the smart contract in a database;
receiving a request to associate the NFT to the physical asset;
retrieving the encrypted unique identifier of the smart contract from the database;
storing the encrypted unique identifier of the smart contract on a physical tag embedded within the physical asset;
receiving a transfer request to change ownership of the NFT and the physical asset, the transfer request including an identifier associated with a recipient;
executing the smart contract to complete the transfer request; and
generating a new private key associated with a recipient wallet based on the identifier with the recipient;
re-encrypting the unique identifier of the smart contract using the new private key associated with the recipient wallet; and storing the re-encrypted unique identifier of the smart contract in the database.

2. The method of claim 1, wherein the encrypted unique identifier of the smart contract is stored on the physical tag embedded within the physical asset using near-field communication.

3. The method of claim 1, wherein the physical tag has a unique identifier, the method further comprising:

generating an association between the unique identifier of the physical tag with the NFT based on the encrypted unique identifier of the smart contract; and storing the association between the unique identifier of the physical tag with the NFT based on the encrypted unique identifier of the smart contract in the database.

4. The method of claim 2, further comprising:

scanning, by a user device, the physical tag storing the encrypted unique identifier; and decrypting the encrypted unique identifier using the private key.

5. The method of claim 4, further comprising:

identifying the NFT on a blockchain platform based on the decrypting;

retrieving the smart contract from the database associated with the NFT; and providing a set of transaction options to the user device based on the smart contract.

6. The method of claim 5, further comprising:

receiving user input associated with the provided set of transaction options at the user device; and executing the smart contract based on the received user input.

7. A system comprising one or more processors and memory operably coupled with the one or more processors, wherein the memory stores instructions that, in response to the execution of the instructions by one or more processors, cause the one or more processors to perform operations including:

receiving a request to generate a non-fungible token (NFT) in association with a physical asset;

generating a wallet having a private key;

configuring a smart contract associated with the NFT, the smart contract having a unique identifier;

encrypting the unique identifier of the smart contract using the private key of the wallet; and storing the encrypted unique identifier of the smart contract in a database;

receiving a request to associate the NFT to the physical asset;

retrieving the encrypted unique identifier of the smart contract from the database; and storing the encrypted unique identifier of the smart contract on a physical tag embedded within the physical asset;

receiving a transfer request to change ownership of the NFT and the physical asset, the transfer request including an identifier associated with a recipient;

executing the smart contract to complete the transfer request; and generating a new private key associated with a recipient wallet based on the identifier with the recipient;

re-encrypting the unique identifier of the smart contract using the new private key associated with the recipient wallet; and storing the re-encrypted unique identifier of the smart contract in the database.

8. The system of claim 7, wherein the encrypted unique identifier of the smart contract is stored on the physical tag embedded within the physical asset using near-field communication.

9. The system of claim 7, wherein the physical tag has a unique identifier and wherein the operations further comprise:

generating an association between the unique identifier of the physical tag with the NFT based on the encrypted unique identifier of the smart contract; and storing the association between the unique identifier of the physical tag with the NFT based on the encrypted unique identifier of the smart contract in the database.

10. The system of claim 8, wherein the operations further comprise:

scanning, by a user device, the physical tag storing the encrypted unique identifier; and decrypting the encrypted unique identifier using the private key.

11. The system of claim 10, wherein the operations further comprise:

identifying the NFT on a blockchain platform based on the decrypting;

retrieving the smart contract from the database associated with the NFT; and providing a set of transaction options to the user device based on the smart contract.

12. The system of claim 11, wherein the operations further comprise:

receiving user input associated with the provided set of transaction options at the user device; and executing the smart contract based on the received user input.

13. One or more non-transitory computer-readable storage media storing one or more sequences of instructions which, when executed using one or more processors, cause the one or more processors to execute a method comprising:

receiving a request to generate a non-fungible token (NFT) in association with a physical asset;

generating a wallet having a private key;

configuring a smart contract associated with the NFT, the smart contract having a unique identifier;

encrypting the unique identifier of the smart contract using the private key of the wallet; and storing the encrypted unique identifier of the smart contract in a database;

receiving a request to associate the NFT to the physical asset;

retrieving the encrypted unique identifier of the smart contract from the database; and storing the encrypted unique identifier of the smart contract on a physical tag embedded within the physical asset;

receiving a transfer request to change ownership of the NFT and the physical asset, the transfer request including an identifier associated with a recipient;

executing the smart contract to complete the transfer request; and generating a new private key associated with a recipient wallet based on the identifier with the recipient;

re-encrypting the unique identifier of the smart contract using the new private key associated with the recipient wallet; and storing the re-encrypted unique identifier of the smart contract in the database.

14. The one or more non-transitory computer-readable storage media of claim 13, wherein the encrypted unique identifier of the smart contract is stored on the physical tag embedded within the physical asset using near-field communication.

15. The one or more non-transitory computer-readable storage media of claim 13, wherein the physical tag has a unique identifier, the method further comprising:

generating an association between the unique identifier of the physical tag with the NFT based on the encrypted unique identifier of the smart contract; and storing the association between the unique identifier of the physical tag with the NFT based on the encrypted unique identifier of the smart contract in the database.

16. The one or more non-transitory computer-readable storage media of claim 14, the method further comprising:

scanning, by a user device, the physical tag storing the encrypted unique identifier;

decrypting the encrypted unique identifier using the private key;

identifying the NFT on a blockchain platform based on the decrypting;

retrieving the smart contract from the database associated with the NFT; and providing a set of transaction options to the user device based on the smart contract.

17. The one or more non-transitory computer-readable storage media of claim 16, the method further comprising:

receiving user input associated with the provided set of transaction options at the user device; and executing the smart contract based on the received user input.

* * * * *